(12) United States Patent
Anand et al.

(10) Patent No.: US 10,458,058 B1
(45) Date of Patent: Oct. 29, 2019

(54) 90 DEGREE ADJUSTABLE CLOSE ELBOW

(71) Applicant: LAMBRO INDUSTRIES, INC., Amityville, NY (US)

(72) Inventors: Shivraj Anand, Dix Hills, NY (US); Scott Racywolski, Shirley, NY (US); Ricardo Chiari, Oscala, FL (US)

(73) Assignee: Lambro Industries, Inc., Amityville, NY (US)

( * ) Notice: Subject to any disclaimer, the term of this patent is extended or adjusted under 35 U.S.C. 154(b) by 258 days.

(21) Appl. No.: 15/454,406

(22) Filed: Mar. 9, 2017

Related U.S. Application Data

(60) Provisional application No. 62/359,279, filed on Jul. 7, 2016.

(51) Int. Cl.
  *F26B 3/34* (2006.01)
  *D06F 58/20* (2006.01)
  *F16L 27/08* (2006.01)
  *F16L 43/00* (2006.01)

(52) U.S. Cl.
  CPC ......... *D06F 58/20* (2013.01); *F16L 27/0845* (2013.01); *F16L 43/001* (2013.01)

(58) Field of Classification Search
  CPC ........ D06F 58/10; D06F 58/20; F16L 43/001; F16L 43/002; F16L 43/02; F16L 27/0845
  USPC ...................................................... 34/265, 261
  See application file for complete search history.

(56) References Cited

U.S. PATENT DOCUMENTS

| | | | | |
|---|---|---|---|---|
| 777,552 | A * | 12/1904 | Smith | |
| 3,185,506 | A * | 5/1965 | Szlashta | F16L 9/02 285/136.1 |
| 6,230,418 | B1 * | 5/2001 | Gomulinski | D06F 58/04 285/181 |
| 6,370,794 | B1 * | 4/2002 | Tuggle | D06F 58/20 285/147.1 |

* cited by examiner

*Primary Examiner* — John P McCormack
(74) *Attorney, Agent, or Firm* — Galgano IP Law PLLC; Thomas M. Galgano

(57) ABSTRACT

A 90 degree adjustable elbow connector for a dryer exhaust assembly, including first and second body halves having concave inner surfaces and convex outer surfaces which are connected together to collectively form a hollow, tubular elbow body defining a channel therebetween. The elbow body has a first open end and an opposite second open end disposed 90 degrees to said first open end. A ring-shaped first collar is rotatably connected to the first end of the elbow body to permit 360 degree rotation relative to the elbow body. The first collar is configured and dimensioned to connect to a dryer exhaust vent. A ring-shaped second collar is rotatably connected to the second end of the elbow body to permit 360 degree rotation relative to the elbow body. The second collar is configured and dimensioned to connect to a dryer exhaust duct.

19 Claims, 6 Drawing Sheets

90 DEGREE ADJUSTABLE CLOSE ELBOW

CROSS-REFERENCE TO RELATED APPLICATION

This application claims benefit from U.S. Provisional Patent Application No. 62/359,279, filed Jul. 7, 2016, the contents of which are hereby incorporated by reference.

BACKGROUND OF THE INVENTION

1. Field of the Invention

The invention is generally in the field of exhaust vents and ducts for clothes dryers. More particularly, the present invention is a 90 degree adjustable elbow connector for use in a dryer exhaust assembly to connect the exhaust vent of a clothes dryer to an exhaust duct.

2. Brief Description of the Prior Art

There are various elbow connectors known in the prior art for use in connection with clothes dryer exhaust assemblies. However, prior art elbow connectors typically have corners within their construction that do not allow for complete unrestricted air flow. Moreover, in the prior art elbow connectors, there is often excess aluminum used that creates areas within the elbow connector where the air flow can collect lint. These corners or areas within the elbow connectors are a fire hazard as the lint caught therein can potentially ignite from the high degree temperatures exhausted from the clothes dryer.

Accordingly, it is desirable to have an elbow connector for a dryer exhaust assembly without the corners or areas within the prior art elbows that can collect lint. While there are many known elbow connectors for use in dryer exhaust assemblies, they are unsatisfactory due to these areas and corners which can collect lint and cause a potential fire hazard. Thus, so far as is known, none of the prior art elbow connectors resolve these deficiencies in a simple, effective and yet highly advantageous manner as in the present invention discussed herein.

SUMMARY OF THE INVENTION

Accordingly, it is an object of the present invention to provide a novel elbow connector for a dryer exhaust assembly.

It is another object of the present invention to provide an elbow connector which eliminates corners of the prior art elbows and has a smooth interior surface that minimizes areas within the elbow that can collect lint.

Furthermore, it is an object of the present invention to provide an elbow connector which allows for unobstructed air flow from a clothes dryer.

Additionally, it is an object of the present invention to provide an elbow connector which is adjustably connected to the dryer exhaust vent and to the dryer exhaust duct.

In addition, it is an object of the present invention to provide an elbow connector which is able to rotate 360 degrees relative to both the dryer exhaust vent and the dryer exhaust duct and allow for the dryer to be moved without disconnecting from the duct.

It is also an object of the present invention to provide an elbow connector which is compact and has a space saving design.

Moreover, it is an object of the present invention to provide an elbow connector that resists crushing.

Certain of the foregoing and related objects are readily attained according to the present invention through the provision of a 90 degree adjustable elbow connector for a dryer exhaust assembly, comprising a first body half having a concave inner surface and a convex outer surface and a second body half having a concave inner surface and a convex outer surface and generally being a mirror image of said first body half, said first and second body halves being connected together to collectively form a hollow, tubular elbow body defining a channel therebetween and wherein said elbow body has a first open end and an opposite second open end disposed 90 degrees to said first open end; a generally ring-shaped first collar having an inner end that is rotatably connected to said first end of said elbow body to permit said first collar to rotate 360 degrees relative to said elbow body and said first collar having an opposite outer end which is configured and dimensioned to connect to a dryer exhaust vent; and a generally ring-shaped second collar having an inner end that is rotatably connected to said second end of said elbow body to permit said second collar to rotate 360 degrees relative to said elbow body and said second collar having an opposite outer end which is configured and dimensioned to connect to a dryer exhaust duct.

In the preferred embodiment, said first and second body halves each have an upper edge and a fin extending outwardly from said upper edge. Preferably, said fins on said first and second body halves connect together to join said first body half to said second body half. It is desirable that said fin on said first body half has at least one outwardly projecting tab having an upper tab portion that folds over said fin on said second body half and said fin on said second body half has at least one outwardly projecting tab having an upper tab portion that folds over said fin on said first body half.

Advantageously, said elbow body and said first and second collars have generally circular cross-sections. Desirably, one of said first end of said elbow body and said inner end of said first collar has an outwardly protruding bead formed thereon and the other of said first end of said elbow body and said inner end of said first collar has a concave channel formed therein which rotatably engages with said bead, to permit said first collar to rotate 360 degrees relative to said elbow body; and wherein one of said second end of said elbow body and said inner end of said second collar has an outwardly protruding bead formed thereon and the other of said second end of said elbow body and said inner end of said second collar has a concave channel formed therein which rotatably engages with said bead, to permit said second collar to rotate 360 degrees relative to said elbow body. It is also preferable that said second collar is made of corrugated metal and said outer end is crimped. In the preferred embodiment, said first collar has a plurality of spaced-apart slits formed therein extending inwardly from said outer end thereof.

Advantageously, said elbow body and said first and second collars collectively form a generally smooth interior surface to minimize debris from being trapped therein. It is also desirable that said elbow body and said first and second collars are made of aluminum.

Certain of the foregoing and related objects are readily attained according to the present invention through the provision of a method of connecting a dryer exhaust vent to a dryer exhaust duct, comprising the steps of providing a dryer exhaust vent, a dryer exhaust duct, and a 90 degree adjustable elbow connector for a dryer exhaust assembly, comprising a first body half having a concave inner surface and a convex outer surface and a second body half having a concave inner surface and a convex outer surface and generally being a mirror image of said first body half, said first and second body halves being connected together to collectively form a hollow, tubular elbow body defining a channel therebetween and wherein said elbow body has a first open end and an opposite second open end disposed 90 degrees to said first open end; a generally ring-shaped first collar having an inner end that is rotatably connected to said first end of said elbow body to permit said first collar to rotate 360 degrees relative to said elbow body and said first collar having an opposite outer end which is configured and dimensioned to connect to a dryer exhaust vent; and a generally ring-shaped second collar having an inner end that is rotatably connected to said second end of said elbow body to permit said second collar to rotate 360 degrees relative to said elbow body and said second collar having an opposite outer end which is configured and dimensioned to connect to a dryer exhaust duct; connecting said first collar to said dryer exhaust vent; and connecting said second collar to said dryer exhaust duct.

Advantageously, said first and second body halves each have an upper edge and a fin extending outwardly from said upper edge. Desirably, said fins on said first and second body halves connect together to join said first body half to said second body half. It is also preferred that said fin on said first body half has at least one outwardly projecting tab having an upper tab portion that folds over said fin on said second body half and said fin on said second body half has at least one outwardly projecting tab having an upper tab portion that folds over said fin on said first body half. Preferably, said elbow body and said first and second collars have generally circular cross-sections.

It is also desirable that one of said first end of said elbow body and said inner end of said first collar has an outwardly protruding bead formed thereon and the other of said first end of said elbow body and said inner end of said first collar has a concave channel formed therein which rotatably engages with said bead, to permit said first collar to rotate 360 degrees relative to said elbow body; and wherein one of said second end of said elbow body and said inner end of said second collar has an outwardly protruding bead formed thereon and the other of said second end of said elbow body and said inner end of said second collar has a concave channel formed therein which rotatably engages with said bead, to permit said second collar to rotate 360 degrees relative to said elbow body. Advantageously, said second collar is made of corrugated metal and said outer end is crimped. Preferably, said first collar has a plurality of spaced-apart slits formed therein extending inwardly from said outer end thereof.

Certain of the foregoing and related objects are readily attained according to the present invention through the provision of a dryer exhaust assembly, comprising a dryer having a dryer exhaust vent; a dryer exhaust duct; and a 90 degree adjustable elbow connector for a dryer exhaust assembly, comprising a first body half having a concave inner surface and a convex outer surface and a second body half having a concave inner surface and a convex outer surface and generally being a mirror image of said first body half, said first and second body halves being connected together to collectively form a hollow, tubular elbow body defining a channel therebetween and wherein said elbow body has a first open end and an opposite second open end disposed 90 degrees to said first open end; a generally ring-shaped first collar having an inner end that is rotatably connected to said first end of said elbow body to permit said first collar to rotate 360 degrees relative to said elbow body and said first collar having an opposite outer end which is configured and dimensioned to connect to a dryer exhaust vent; and a generally ring-shaped second collar having an inner end that is rotatably connected to said second end of said elbow body to permit said second collar to rotate 360 degrees relative to said elbow body and said second collar having an opposite.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

DETAILED DESCRIPTION OF THE PREFERRED EMBODIMENTS

Figure 1:
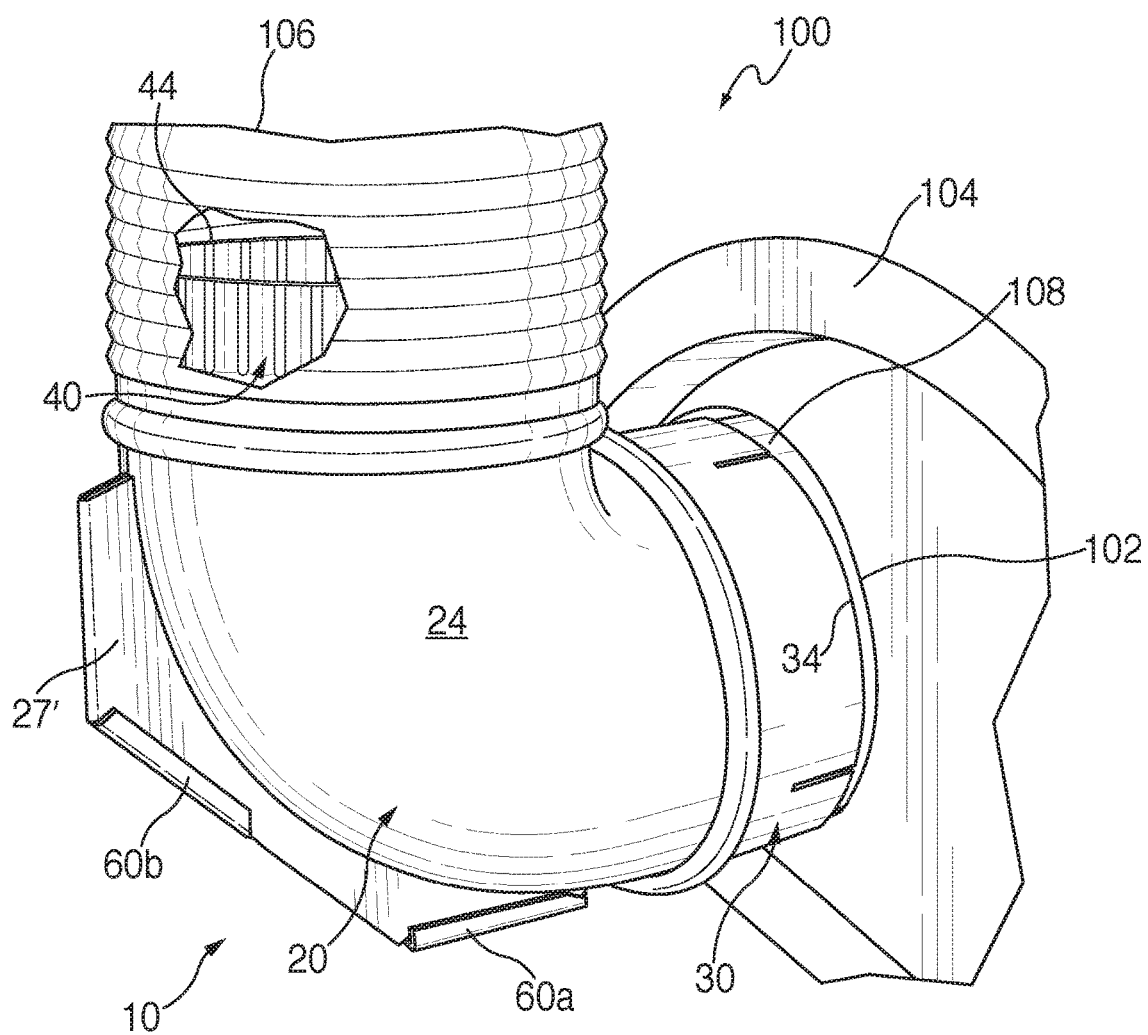
FIG. 1 illustrates the elbow connector of the present invention, connected in between an exhaust vent of a clothes dryer and an exhaust duct.

Turning now in detail to the drawings and in particular FIG. 1, which illustrates a 90 degree adjustable elbow connector, according to the present invention, generally designated by reference numeral 10, for use in a dryer exhaust assembly 100. Particularly, as seen in FIG. 1, elbow 10 is utilized to connect the tailpipe 108 of an exhaust vent 102 of a clothes dryer 104 to an exhaust duct 106. More particularly, elbow 10, according to the present invention, has two open ends 34 and 44. First end 34 is configured and dimensioned to connect to exhaust vent 102 of clothes dryer 104 and second end 44 is configured and dimensioned to connect to exhaust duct 106, to allow removal and subsequent venting of air from dryer 104.

Figure 2:
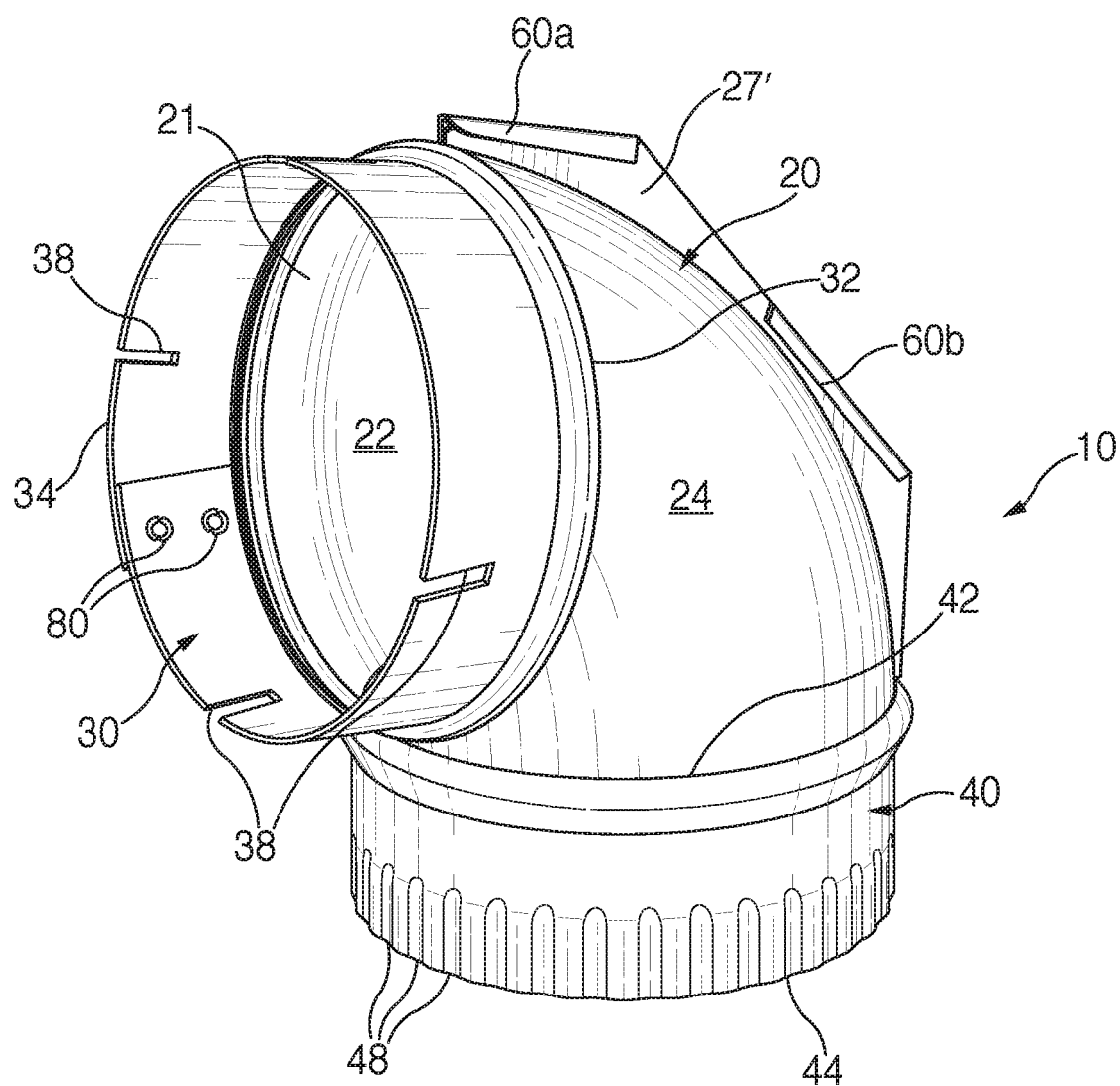
FIG. 2 is a perspective view of the elbow connector of the present invention.
Figure 3:
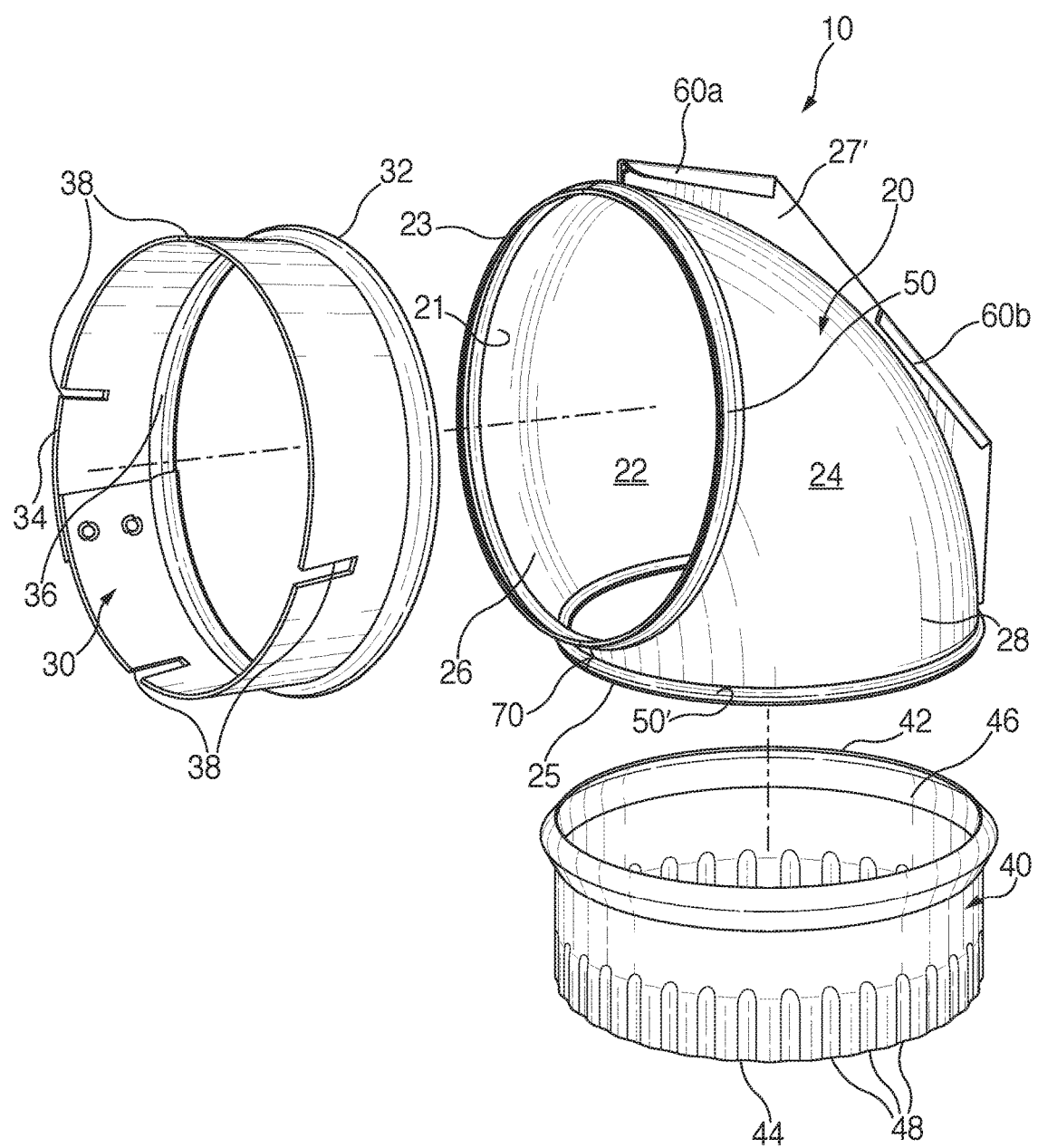
FIG. 3 is an exploded perspective view of the elbow body and collars of the elbow connector.
Figure 4:
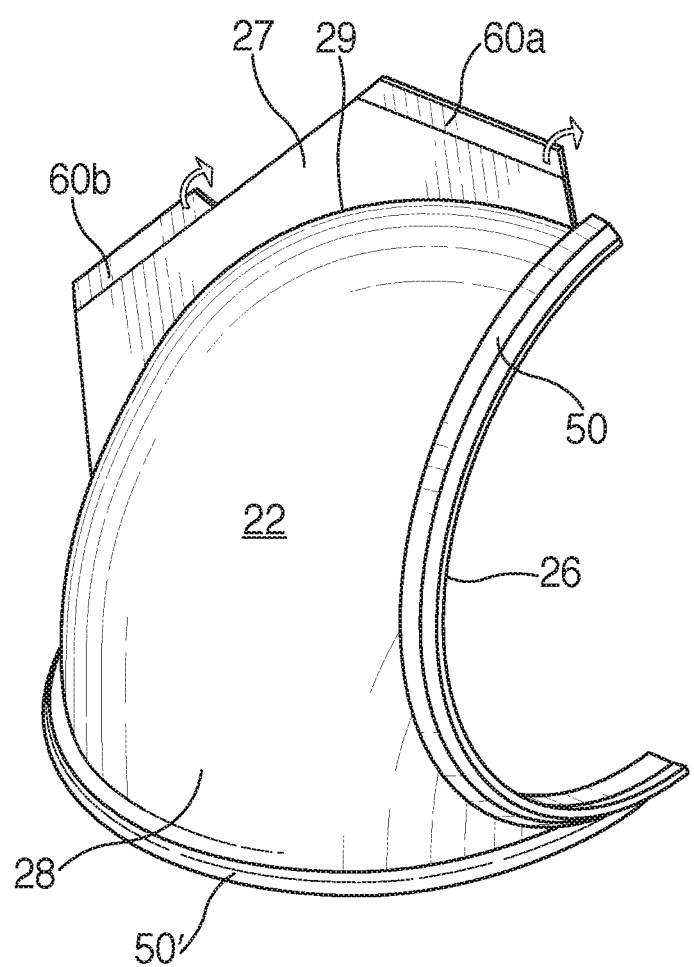
FIG. 4 is a perspective view of a first body half of the elbow body.
Figure 5:
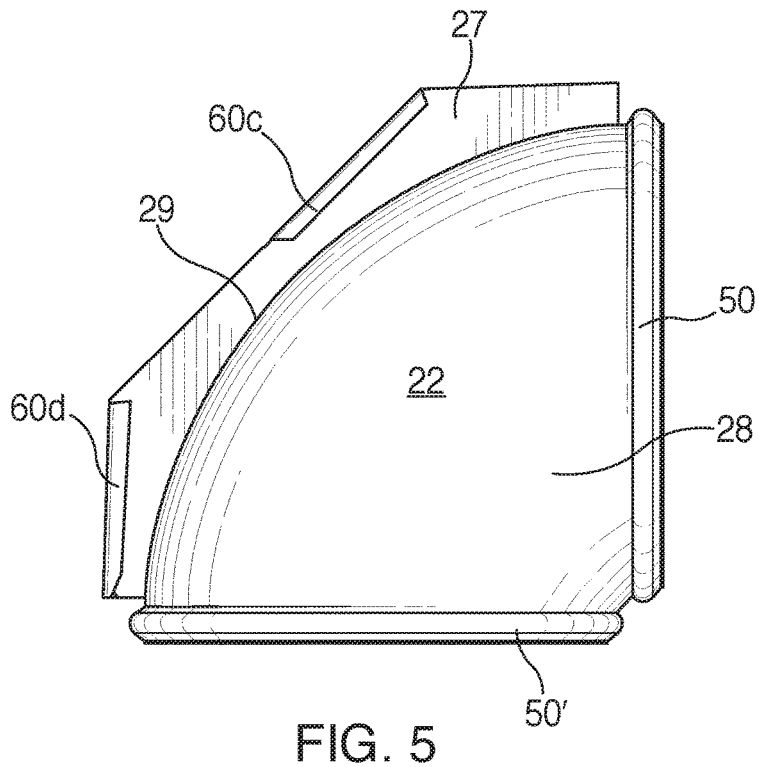
FIG. 5 is a side elevation view of the first body half of the elbow body.
Figure 6:
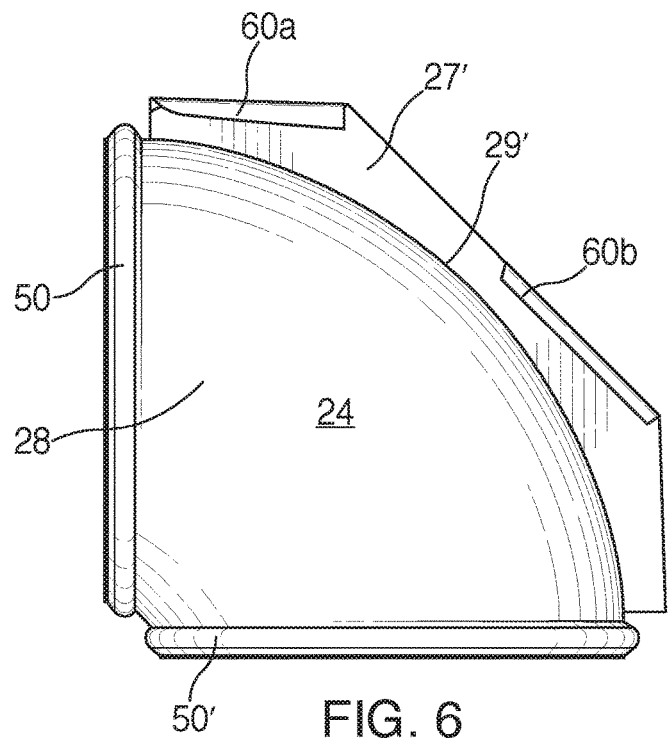
FIG. 6 is a side elevation view of the second body half of the elbow body.

Particularly, as seen in FIGS. 2 and 4-6, elbow 10 includes an elbow body 20 which is formed from two body halves 22 and 24 which are secured together. First body half 22 of elbow body 20 is best illustrated in FIGS. 4-5 and the second body half 24, as seen in FIG. 6, is generally a mirror image of first body half 22. However, due to manufacturing variations, halves 22 and 24 may have some minor variations. Furthermore, as described more fully below, the exact shape of tabs 60 on fins 27 and 27' may vary slightly between halves 22 and 24. As also illustrated in FIGS. 2-4, first body half 22 and second body half 24 each have a generally concave inner surface 26 and a generally convex outer surface 28.

Body halves 22 and 24 are connected together to collectively form elbow body 20, as seen in FIGS. 2-3. As seen best in FIGS. 2-3, elbow body 20 is hollow, generally tubular, and defines a channel 21 therein having a generally circular-shaped cross section. The interior channel 21 of elbow body 20 has a rounded configuration as a result of concave inner surfaces 26 of body halves 22 and 24, which collectively form a generally smooth interior surface to minimize debris from being trapped therein. This structure is an improvement over the prior art elbows in that it maximizes air flow and reduces lint collection which is a potential fire hazard.

Furthermore, as seen best in FIG. 3, elbow body 20 has a first open end 23 and an opposite second open end 25, which is disposed 90 degrees relative to first open end 23. Body halves 22 and 24 are joined together by fins 27 and 27', shown best in FIGS. 4-6. Particularly, as also seen in FIGS. 4-6, body halves 22 and 24 have upper edges 29 and 29', respectively, that extend along the top and rear side of body halves 22, 24. Fins 27 and 27' extend outwardly from upper edges 29 and 29' of body halves 22 and 24, respectively, and are utilized to join body halves 22 and 24 together, without obstructing airflow through channel 21.

Particularly, fins 27 and 27' on body halves 22, 24 are created by excess aluminum which is formed during manufacturing body halves 22 and 24. The excess aluminum is then cut to create fins 27 and 27'. As seen in FIGS. 4-6, fins 27 and 27' are then bent at certain locations where the fins on corresponding halves 22, 24 meet. More particularly, as seen in FIGS. 4-5, fin 27 on body half 22 has tabs 60a and 60b projecting outwardly therefrom and, as seen in FIGS. 5-6, fin 27' on body half 24 has tabs 60c and 60d projecting outwardly therefrom. Tabs 60a and 60b of fin 27 are bent and folded over fin 27' on body half 24 (see, FIGS. 4 and 6) and tabs 60c and 60d on fin 27' on body half 24 are bent and folded over fin 27 on body half 22 (see, FIGS. 5-6), to secure body halves 22 and 24 together. Fins 27 and 27' secure body halves 22 and 24 together and aid in eliminating air flow leakage from elbow 10 when installed to clothes dryer 104.

Tabs 60a, 60b, 60c, and 60d on fins 27 and 27' can be folded mechanically and/or manually over the other fin. Furthermore, the exact shape and arrangement of fins 27 and 27' may vary as well as the location of tabs 60a-60d. As also seen in FIG. 3, the bottom center of elbow body 20 is spot welded 70 to further secure body halves 22 and 24 of elbow body 20 together and prevent the halves 22 and 24 from collapsing.

Figure 7:
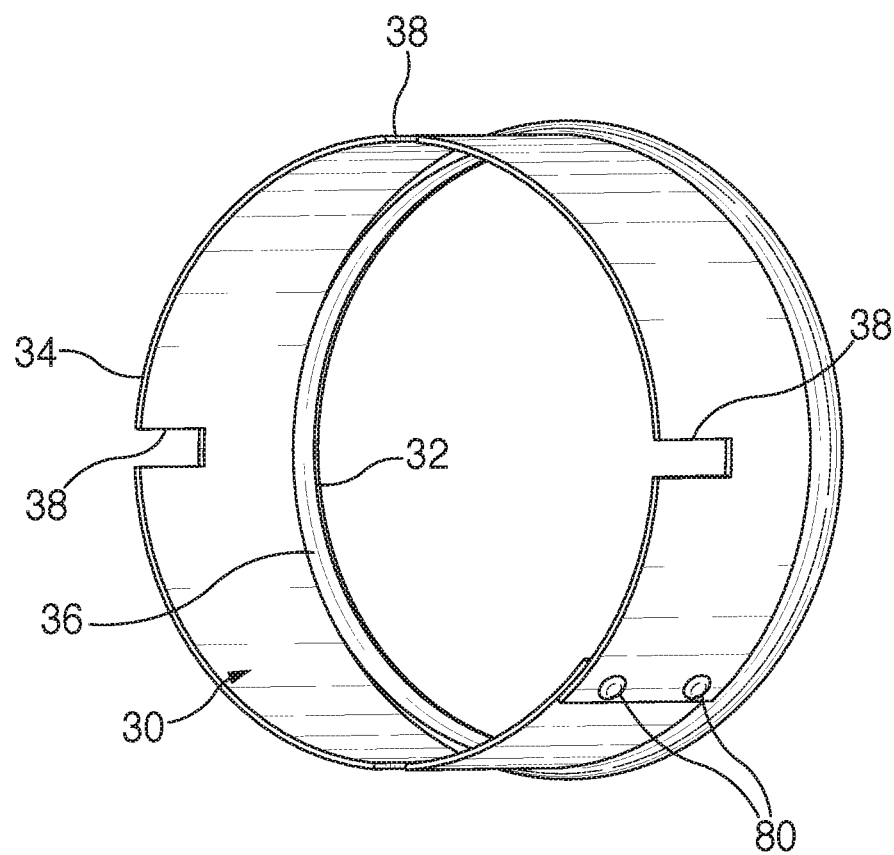
FIG. 7 is a perspective view of a collar, according to the present invention.

Additionally, as seen in FIGS. 2-3, and 7 elbow connector 10 further comprises generally ring-shaped collars 30 and 40, having generally circular-shaped cross-sections. Collars 30 and 40 are rotatably secured to ends 23 and 25, respectively, of elbow body 20, in a manner which permits 360 degree rotation of collars 30 and 40 relative to elbow body 20. Particularly, first collar 30 has an inner end 32 and an opposite outer end 34 and second collar 40 also has an inner end 42 and an opposite outer end 44. As seen best in FIGS. 2-3, inner end 32 of collar 30 is rotatably connected to first end 23 of elbow body 20, to permit collar 30 to rotate 360 degrees relative to elbow body 20. Similarly, inner end 42 of collar 40 is rotatably connected to second end 25 of elbow body 20, to permit collar 40 to rotate 360 degrees relative to elbow body 20. As seen in FIG. 1, outer end 34 of collar 30 is configured and dimensioned to connect to dryer exhaust vent 102 and outer end 44 of collar 40 is configured and dimensioned to connect to exhaust duct 106.

As best illustrated in FIG. 3, elbow body 20 includes outwardly projecting beads 50 and 50' which are formed around ends 23 and 25, respectively. Beads 50, 50' are rounded protrusions having a convex shape which protrudes outwardly above the outer surface of elbow body 20 and are formed adjacent to open ends 23 and 25, respectively. The purpose of beads 50, 50' is to ensure that collars 30 and 40 are held onto elbow body 20 and in a manner that permits 360 degree rotation. Collars 30 and 40 will be fitted over beads 50 and 50', respectively, and the collars 30, 40 are riveted to themselves with rivets 80 at specific predetermined measurements, to allow the collars 30 and 40 to rotate 360 degrees relative to elbow body 20.

As seen in FIGS. 3 and 7, collars 30 and 40 have concave channels 36 and 46, respectively, formed along the inner surface thereof, which generally correspond to the shape of beads 50 and 50'. Collars 30 and 40 are received over ends 23 and 25, respectively, of elbow body 20, with the beads 50 and 50' received within channels 36 and 46, respectively. Furthermore, the inner ends 32 and 42 of collars 30 and 40, respectively, are disposed inwardly from channels 36 and 46, when collars 30 and 40 are received over elbow body 20, to secure the collars to elbow body 20. In addition, the inner ends 32 and 42 of collars 30 and 40, respectively, have narrower circumferences than that of beads 50 and 50', respectively, to prevent collars 30 and 40 from slipping off beads 50 and 50'. While the present invention is shown and described with beads 50 and 50' formed on elbow body 20 and corresponding channels 36 and 46 formed on the collars 30 and 40, it can be appreciated that the elbow body may be formed with channels and the collars formed with corresponding beads.

When assembled as in FIG. 2, beads 50 and 50' are received in channels 36 and 46 with a friction fit that is tight enough to hold collars 30 and 40 in place on elbow body 20 but loose enough to allow for collars 30 and 40 to rotate 360 degrees relative to elbow body 20, allowing for many different options for placement during installation. Furthermore, the connection of collars 30 and 40 to elbow body 20 is such that it allows unobstructed airflow through elbow 10.

Collars 30 and 40 are manufactured by wrapping a planar sheet of aluminum cut into the desired shape and size around each of beads 50 and 50', with beads 50 and 50' received within channels 36 and 46. The collars 30 and 40 are each formed into a ring-shaped arrangement and riveted to itself with rivets 80 to, in turn, secure the collars 30 and 40 to ends 23 and 25 of elbow body 20, in a manner to permit 360 degree rotation. The configuration of elbow 10 having 360 degree rotatable collars 30 and 40 is beneficial in that it allows for ease of installation as well as allowing for the elbow 10 to be positioned for a multitude of installation options and allows for dryer 104 to be moved without having to disconnect dryer 104 from duct 106.

As seen in FIGS. 2-3, preferably collar 40 is made of corrugated metal and has a plurality of grooves 48 formed therein. As a result, outer end 44 of collar 40 has a crimped configuration which is used to connect collar 40, and in turn, elbow connector 10 to exhaust duct 106, as in FIG. 1. In the preferred embodiment, the corrugated edge extends inwardly 0.6" from outer end 44 of collar 40. The grooves or threading 48 allows for a better connection and ease of connecting the elbow 10 to duct 106.

As also seen in FIG. 3, collar 30 has a plurality of spaced apart slits 38 formed therein, extending inwardly from outer end 34. Collar 30 is configured and dimensioned to connect to the tailpipe 108 of a dryer exhaust vent 102 which extrudes from clothes dryer 104, as seen in FIG. 1. Slits 38 allow for ease of adjustment of the connection between tailpipe 108 of the clothes dryer 104, if required.

Preferably, elbow 10 is made of 0.016" thick aluminum material, however, other suitable materials are possible and would be well known to those having ordinary skill in the art. It is also preferred that the circular openings of elbow 10 have a 4" diameter that would fit a 4" duct and connect to the majority of the clothes dryers that are manufactured today by various companies.

Advantageously, elbow 10 has a compact configuration to permit installation of clothes dryer 104 in close placement to a wall when installing in constricted spaces and areas. In the preferred embodiment, the height of elbow 10 is approximately 5.875" and the width is approximately 6.125." However, other suitable dimensions may be utilized. Furthermore, in the preferred embodiment, the diameter of beads 50 and 50' is approximately 4.38" and the width of collars 30 and 40 is 3.875." Moreover, elbow 10 is designed to allow for unrestricted air flow from a clothes dryer through the elbow, i.e., no corners, bends or any other potential obstructions which could prevent clear and free air flow when a clothes dryer is expelling air during its drying process. Additionally, the elbow 10 is able to rotate 360 degrees in order to set the best position to the clothes dryer and to the duct during installation and allow for generally unrestricted passage for the air flow to travel.

While particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention.

What is claimed is:

1. A rotatable 90 degree fixed elbow connector for a dryer exhaust assembly, comprising:
    a first body half having a concave inner surface and a convex outer surface and a second body half having a concave inner surface and a convex outer surface and generally being a mirror image of said first body half, said first and second body halves being connected together to collectively form a hollow, tubular 90 degree fixed elbow body defining a channel therebetween and wherein said elbow body has a first open end and an opposite second open end disposed 90 degrees to said first open end;
    a generally ring-shaped first collar having an inner end that is rotatably connected to said first end of said elbow body to permit said first collar to rotate 360 degrees relative to said elbow body and said first collar having an opposite outer end which is configured and dimensioned to connect to a dryer exhaust vent; and
    a generally ring-shaped second collar having an inner end that is rotatably connected to said second end of said elbow body to permit said second collar to rotate 360 degrees relative to said elbow body and said second collar having an opposite outer end which is configured and dimensioned to connect to a dryer exhaust duct.

2. The elbow connector according to claim 1, wherein: said first and second body halves each have an upper edge and a fin extending outwardly from said upper edge.

3. The elbow connector according to claim 2, wherein: said fins on said first and second body halves connect together to join said first body half to said second body half.

4. The elbow connector according to claim 2, wherein: said fin on said first body half has at least one outwardly projecting tab having an upper tab portion that folds over said fin on said second body half and said fin on said second body half has at least one outwardly projecting tab having an upper tab portion that folds over said fin on said first body half.

5. The elbow connector according to claim 1, wherein: said elbow body and said first and second collars have generally circular cross-sections.

6. The elbow connector according to claim 1, wherein: one of said first end of said elbow body and said inner end of said first collar has an outwardly protruding bead formed thereon and the other of said first end of said elbow body and said inner end of said first collar has a concave channel formed therein which rotatably engages with said bead, to permit said first collar to rotate 360 degrees relative to said elbow body; and
wherein one of said second end of said elbow body and said inner end of said second collar has an outwardly protruding bead formed thereon and the other of said second end of said elbow body and said inner end of said second collar has a concave channel formed therein which rotatably engages with said bead, to permit said second collar to rotate 360 degrees relative to said elbow body.

7. The elbow connector according to claim 1, wherein: said second collar is made of corrugated metal and said outer end is crimped.

8. The elbow connector according to claim 1, wherein: said first collar has a plurality of spaced-apart slits formed therein extending inwardly from said outer end thereof.

9. The elbow connector according to claim 1, wherein: said elbow body and said first and second collars collectively form a generally smooth interior surface to minimize debris from being trapped therein.

10. The elbow connector according to claim 1, wherein: said elbow body and said first and second collars are made of aluminum.

11. A method of connecting a dryer exhaust vent to a dryer exhaust duct, comprising the steps of:
    providing a dryer exhaust vent, a dryer exhaust duct, and a rotatable 90 degree fixed elbow connector for a dryer exhaust assembly, comprising a first body half having a concave inner surface and a convex outer surface and a second body half having a concave inner surface and a convex outer surface and generally being a mirror image of said first body half, said first and second body halves being connected together to collectively form a hollow, tubular 90 degree fixed elbow body defining a channel therebetween and wherein said elbow body has a first open end and an opposite second open end disposed 90 degrees to said first open end; a generally ring-shaped first collar having an inner end that is rotatably connected to said first end of said elbow body to permit said first collar to rotate 360 degrees relative to said elbow body and said first collar having an opposite outer end which is configured and dimensioned to connect to a dryer exhaust vent; and a generally ring-shaped second collar having an inner end that is rotatably connected to said second end of said elbow body to permit said second collar to rotate 360 degrees relative to said elbow body and said second collar having an opposite outer end which is configured and dimensioned to connect to a dryer exhaust duct;
    connecting said first collar to said dryer exhaust vent; and connecting said second collar to said dryer exhaust duct.

12. The elbow connector according to claim 11, wherein: said first and second body halves each have an upper edge and a fin extending outwardly from said upper edge.

13. The elbow connector according to claim 12, wherein:
said fins on said first and second body halves connect together to join said first body half to said second body half.

14. The elbow connector according to claim 12, wherein:
said fin on said first body half has at least one outwardly projecting tab having an upper tab portion that folds over said fin on said second body half and said fin on said second body half has at least one outwardly projecting tab having an upper tab portion that folds over said fin on said first body half.

15. The elbow connector according to claim 11, wherein:
said elbow body and said first and second collars have generally circular cross-sections.

16. The elbow connector according to claim 11, wherein:
one of said first end of said elbow body and said inner end of said first collar has an outwardly protruding bead formed thereon and the other of said first end of said elbow body and said inner end of said first collar has a concave channel formed therein which rotatably engages with said bead, to permit said first collar to rotate 360 degrees relative to said elbow body; and wherein one of said second end of said elbow body and said inner end of said second collar has an outwardly protruding bead formed thereon and the other of said second end of said elbow body and said inner end of said second collar has a concave channel formed therein which rotatably engages with said bead, to permit said second collar to rotate 360 degrees relative to said elbow body.

17. The elbow connector according to claim 11, wherein:
said second collar is made of corrugated metal and said outer end is crimped.

18. The elbow connector according to claim 11, wherein:
said first collar has a plurality of spaced-apart slits formed therein extending inwardly from said outer end thereof.

19. A dryer exhaust assembly, comprising:

a dryer having a dryer exhaust vent;

a dryer exhaust duct; and a rotatable 90 degree fixed elbow connector for a dryer exhaust assembly, comprising a first body half having a concave inner surface and a convex outer surface and a second body half having a concave inner surface and a convex outer surface and generally being a mirror image of said first body half, said first and second body halves being connected together to collectively form a hollow, tubular 90 degree fixed elbow body defining a channel therebetween and wherein said elbow body has a first open end and an opposite second open end disposed 90 degrees to said first open end;

a generally ring-shaped first collar having an inner end that is rotatably connected to said first end of said elbow body to permit said first collar to rotate 360 degrees relative to said elbow body and said first collar having an opposite outer end which is configured and dimensioned to connect to a dryer exhaust vent and a generally ring-shaped second collar having an inner end that is rotatably connected to said second end of said elbow body to permit said second collar to rotate 360 degrees relative to said elbow body and said second collar having an opposite outer end which is configured and dimensioned to connect to a dryer exhaust duct.

\* \* \* \* \*